DEPOSITED ACTUATOR PERFORATED MEDIA READER

Filed Jan. 10, 1968 4 Sheets-Sheet 1

INVENTOR
WILLIAM D. THORNE

BY John B Frisone
ATTORNEY

United States Patent Office 3,505,500
Patented Apr. 7, 1970

3,505,500

DEPOSITED ACTUATOR PERFORATED MEDIA READER

William D. Thorne, Raleigh, N.C., assignor to International Business Machines Corporation, Armonk, N.Y., a corporation of New York Filed Jan. 10, 1968, Ser. No. 696,865
Int. Cl. G06k 7/06; H01h 43/08
U.S. Cl. 235—61.11 7 Claims

ABSTRACT OF THE DISCLOSURE

A perforated media reader in which switch actuating elements are translated across the static media and deposited within the perforations in an actuating position for reading, and collected and returned to a home position when the media reading is successfully completed.

BACKGROUND

Field of the invention

The invention relates to perforated media readers and more particularly to static readers which employ a single perforation sensor per columnar field.

Description of the prior art

There are many readers for perforated media available in the prior art, however, in each instance, the available readers had one or more shortcomings which rendered it unsuitable for inclusion in a low cost large base data collection system.

Such a system must be simple and therefore the terminals which include the reader must be capable of operating without electrical line power, since in many instances it is not conveniently available and making it available would increase total system cost. In view of this fact, static parallel reading was selected.

Static parallel perforated media readers available in the prior art require large forces which, in the contemplated application, would have to be supplied by an operator. Such a requirement would render the reader unacceptable.

Another requirement of the data collection system is that the reader be capable of reading media having a wide variation in thickness since it must be able to read perforated badges as well as standard perforated cards. This requirement could not be met by the prior art for the reasons set forth above with respect to reading forces, however, in those instances where the reading force was not a factor, the ability to read variable thickness media could be accomplished only at great cost.

SUMMARY OF THE INVENTION

The invention contemplates a static parallel perforated media reader in which a plurality of actuators are translated across the medium and deposited in the perforations to actuate means for providing electrical manifestations indicative of the location of the deposited actuator.

One object of the invention is to provide a static parallel perforated media reader which is capable of reading media of variable thickness.

Another object of the invention is to provide a reader as set forth above which does not require large forces for reading and is therefore suitable for use in data collection systems where line power is not readily available.

A further object of the invention is to provide a reader with the characteristics set forth above which is easily and inexpensively manufactured.

The foregoing and other objects, features and advantages of the invention will be apparent from the following more particular description of a preferred embodiment of the invention, as illustrated in the accompanying drawings.

BRIEF DESCRIPTION OF THE DRAWINGS

In FIGURE 1, a perforated record media 10 is inserted in the opening formed between covers 11 and 12. Cover 11 is attached to cover 12 by means not shown and cover 12 is supported from the vertical T shaped member 14 by a pair of screws and a horizontal flange 15 extending from cover 12. Vertical member 14 is attached to a base member 16 by any conventional means such as screws, rivets, bolts or other attaching devices. A guide plate 18 and a cover plate 19 are attached to the vertical support 14 by means not shown and enclosed a plurality of depositable actuators 41 illustrated in greater detail in FIGURES 2, 3 and 4 which will be described below in conjunction with the description of those figures.

Figure 1:
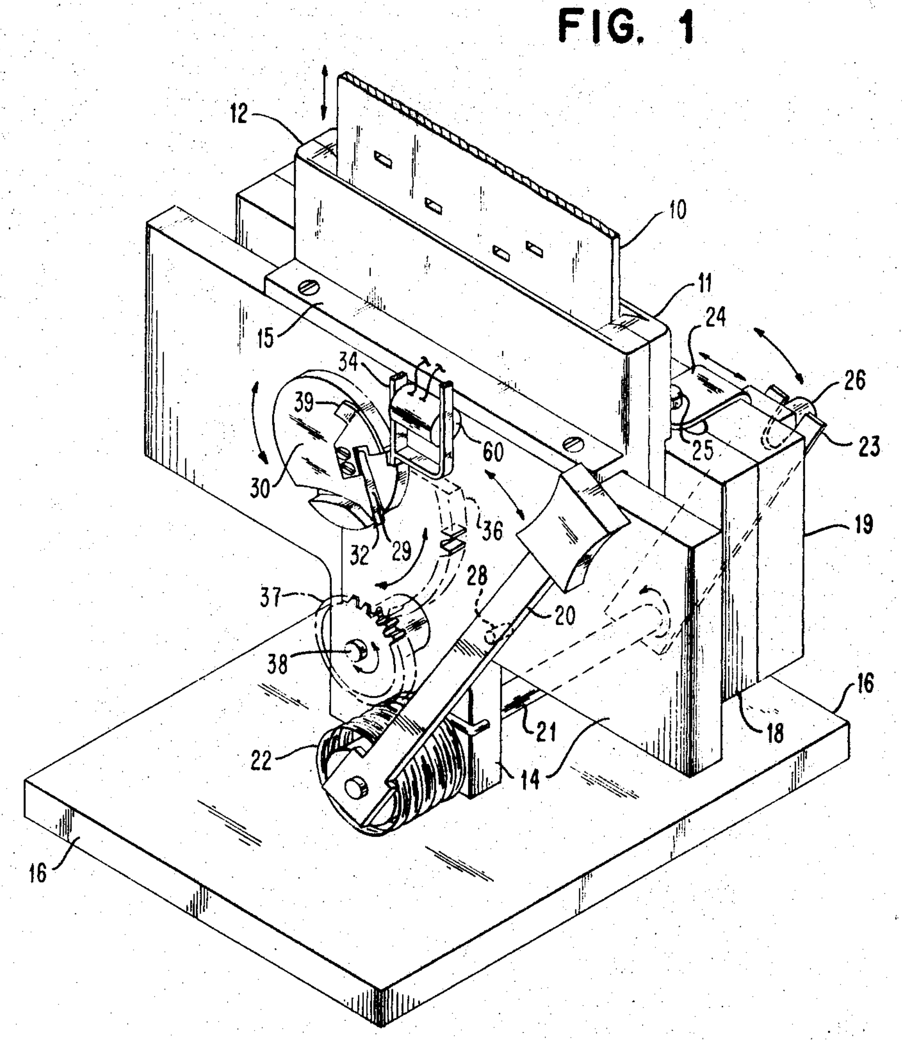
FIGURE 1 is a perspective view of static perforated media reader constructed according to the invention.

When an operator desires to insert information contained on a perforated media into the system, he inserts the media 10 into the opening formed between the cover plates 11 and 12 and moves a pivoted handle 20 from the position illustrated in the drawings to the left. The handle 20 is attached to a shaft 21 which is journaled in the vertical support 14. Movement of the handle 20 from the right position to the left position winds a spring 22 and causes a forked member 23 attached to shaft 21 to execute a similar arcuate movement. Movement of the forked member 23 from right to left causes a carriage 24 to move in a horizontal line from the right most position, illustrated in the drawing, to a left position behind the cover plates 11 and 12.

Figure 2:
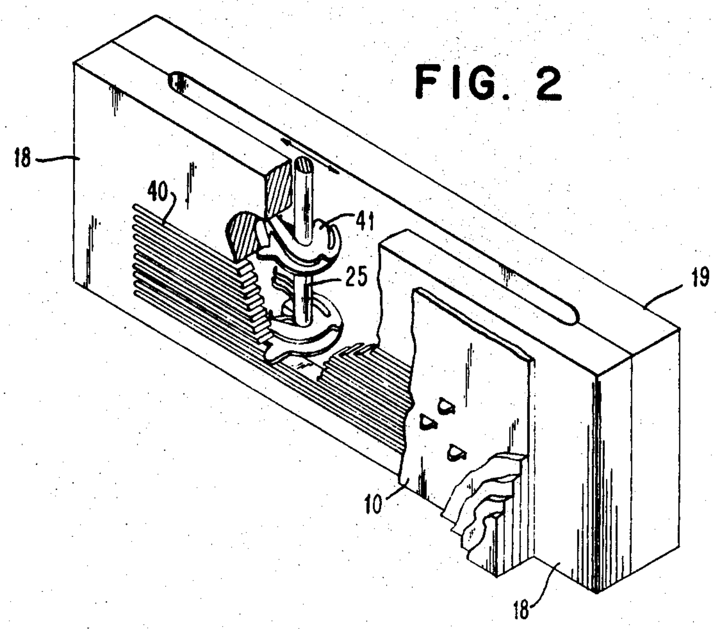
FIGURE 2 is a perspective view of the deposited actuators and their guides in operative relationship with a perforated media.

Carriage 24 supports a rod 25 which translates the depositable actuators 41 as will be described later in connection with the description of FIGURES 2, 3, and 4. Movement of carriage 24 is effected by a stud 26 extending from carriage 24 which fits within the forked member 23 and is forced from right to left as the member 23 rotates with shaft 21. As the handle 20 is moved from right to left, a pin 28 shown in dotted line since it is behind the handle 20 enters groove 29 in a cam member 30 causing the cam member to rotate in a clockwise direction. The pin 28 moves into groove 29 and then back out again causing continuous clockwise rotation of cam member 30. The pin movement is illustrated in detail in FIGURES 5A–5F.

Figures 5A, 5B, 5C:
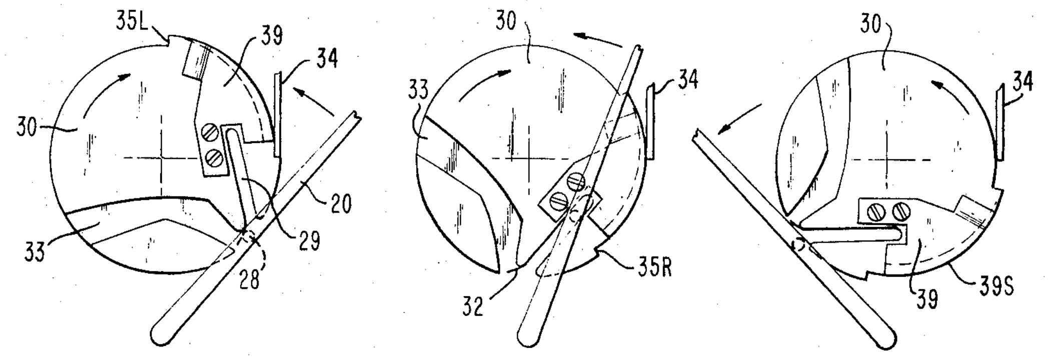
FIGURES 5A–5F inclusive are front elevations of the cam control unit and spring motor winder.
Figures 5D, 5E, 5F:
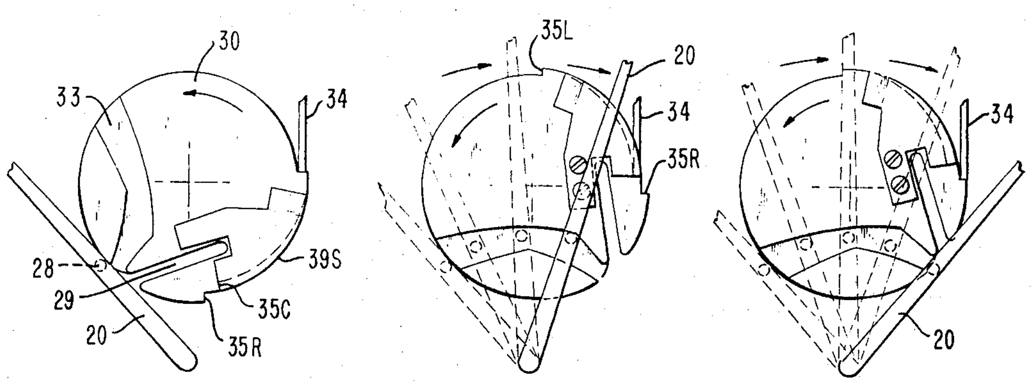

In FIGURE 5A, the pin 28 is shown entering the groove 29. In FIGURE 5B, the pin is shown on its way back out again. In FIGURE 5C, the pin 28 is shown just leaving the groove and in FIGURE 5B the pin is shown on the outer surface of cam 30 at the end of the cocking movement by the operator. A flat spring 32 is attached to the inner wall of groove 29 to prevent pin 28 from entering a channel 33 since pin 28 must travel along the outer surface of the cam and not enter channel 33 except on its return to the home position upon completion of the reading of the card. FIGURES 5E and 5F show the return of the handle 20 to the home position and will be described later in the course of the description of the device. When handle 20 reaches the left most extent of its movement, a loaded interposer 34 engages a radially disposed surface 35L on cam number 30 as shown in FIGURE 5D, and prevents the spring 22 from restoring handle 20 to the righthand position illustrated in FIGURE 1 since cam member 30 is locked by the interposer 34.

As cam 30 is rotated clockwise by the movement of arm 20 and the force exerted by pin 28, it causes a sector gear 36 attached thereto to execute a similar clockwise rotation which in turn causes a gear 37 mounted on a shaft 38 to execute a counter clockwise rotation. Attached to shaft 38, and not visible since it is located immediately behind the vertical support member 14 is a conventional Western Electric dial telephone spring motor. Counter clockwise rotation of shaft 38 winds the dial telephone spring motor which when released, as will be described later on, actuates a rotor 50 shown schematically in FIGURE 7 which scans a distributor 52 also shown schematically in FIGURE 7. Both the operation and function of rotor 50 and distributor 52 will be described later in connection with the description of FIGURE 7. Since they are conventional, they will not be described except in connection with FIGURE 7.

Interposer 34 is under control of a solenoid 60 which when energized causes the interposer 34 to be drawn away from the surface of the cam member 30 and thus releases the cam member causing the member to rotate counter clockwise under influence of the spring motor of the dial telephone mechanism located behind the vertical support member 14. The dial telephone spring motor drives the cam surface in the counter clockwise direction via shaft 38, gear 37 and sector gear 36. As the cam member 30 rotates counter clockwise, the pin 28 rides along the outer surface to the left most entrance of channel 33 as viewed in FIGURES 1 and 5E. As soon as the pin 28 enters channel 33, shown in FIGURE 5E, the handle 20 starts to return to its right hand position. It will only return to the complete right hand position if the counter clockwise rotation of cam member 30 is completed so that the radial surface 35R engages interposer 34 as shown in FIGURE 5F.

Another radial surface 35C will capture the interposer 34 if the data was not properly transmitted to indicate to the operator that the data was not properly transmitted. If the data has been properly transmitted, a second pulse is supplied, by the external system, which energizes solenoid 60 causing the interposer 34 to withdraw momentarily from the surface of cam member 30. If the pulse is provided after the data is read and while the pin 28 is in the channel 33, the interposer 34 withdraws from the surface of cam member 30 permitting a memory spring 39 to move inwardly, thus preventing the radial surface 35C from capturing the interposer 34 since the interposer 34 rides along the surface 39S of the memory spring 39 and passes over the surface 35C and impinges on the surface 35R thus permitting pin 28 to pass through channel 33 and restore the handle to its right most position as illustrated in FIGURE 5F.

Figure 6A:
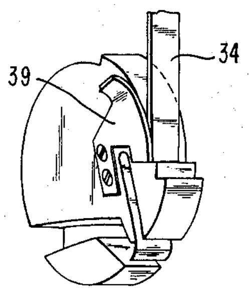
FIGURES 6A and 6B are perspective views of the unit illustrated in FIGURES 5A–5F inclusive and illustrates the operation of the mechanical memory latch.
Figure 6B:
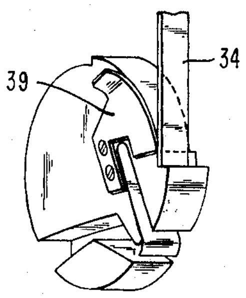

If transmission is not correct, the second pulse is not supplied to solenoid 60 and the interposer 34 rides along the surface of cam member 30 behind spring member 39 and impinges on radial surface 35C thus preventing the handle 20 from returning to its right hand position. When this occurs handle 20 stops at an intermediate position, the operator is instructed to interpret this as an incorrect entry of data and he must retransmit. Retransmission is possible by pressing a reset button which mechanically releases the interposer 34, restores the handle to the right hand position and the operator again operates the handle as previously described. The arrangement of spring 39 is shown in FIGURES 6A and 6B.

When the handle 20 is moved from the right to the left by the operator causing cam member 30 to rotate clockwise, this clockwise rotation is transmitted via the sector gear 36, gear 37 and shaft 38 to a conventional Western Electric dial telephone spring motor located behind vertical member 14. This winds up the spring motor and the counter clockwise rotation described above is provided by this spring motor when interposer 34 is lifted out of the left most radially surface 35L on cam member 30. The dial telephone spring motor which was previously wound provides the necessary torque for driving cam member 30 in the counter clockwise direction.

Rod 25 is translated from right to left as handle 20 is moved from right to left. The rod extends through an opening between guide plate 18 and cover 19 and is best seen in FIGURES 2 and 3. Guide plate 18 is provided with a plurality of openings 40 which provide guides for a plurality of actuators 41. In the embodiment disclosed, there are 10 actuators in all. The actuators are free to slide along the guides formed by opening 40 in plate 18. Each actuator is provided with a first portion 42 which engages and slides along the media 10 as the actuator is translated from the right to left by movement of the rod 25. In addition each actuator is provided with a second portion 43 which is at substantially right angles to the slideable portion 42 for permitting rod 25 to urge the actuator from right to left as it moves along the guide means provided by the opening 40 in plate 18. A third portion 44 provides a spring member which coacts with the cover 19 to retain the actuator when it becomes deposited.

Figure 3:
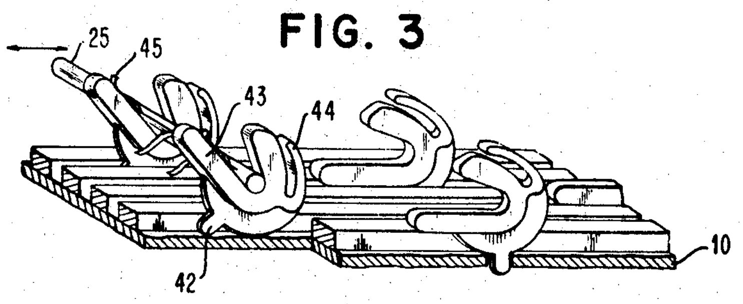
FIGURE 3 is a perspective view of the actuators with the supporting structure removed.

In FIGURE 3, the two actuators on the right have been deposited by encountering perforations in the media 10. As the actuators slide along the guides in contact with the media 10, the portion 42 enters any aperture it encounters in the media. As it enters the aperture, the actuator rotates causing portion 43 to move downward and rod 25 leaves the actuator in the position where it encounters the aperture as shown in FIGURE 3. A plurality of springs 45, one for each actuator, are attached to the rod 25 and assist the actuators in their rotational movement when they encounter the perforation in the media. The portions 42 when deposited extend through the media and actuate diaphragm switches one for each data position and may be constructed as shown in U.S. Patent 3,308,253, issued Mar. 7, 1967. Thus, a switch closure is provided for each deposited actuator. When the rod 25 moves to the left as far as it can go, all the actuators are deposited. At this point, the media may be read since all of the switch closures are made. The switch closures may be made as the actuators enter the perforations or the switch matrix may be arranged so that it is out of contact with the portions 42 until the rod 25 moves past the column fields of the card at which point the switch matrix is brought up into contact with the portions 42.

Figure 4:
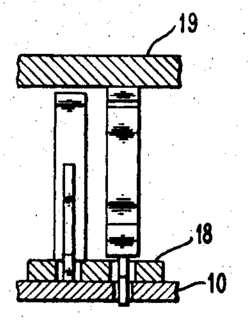
FIGURE 4 is an end view of a pair of actuators in the sensing and nonsensing position.

The portions 44 as may be seen in FIGURE 4 engage the cover plate 19 only after the actuator has been rotated and exert a force on the actuator to retain it in the aperture of the media 10. The force exerted by spring portion 44 assures a switch closure in the diaphragm matrix. Other types of switching arrangements may be employed, however, the diaphragm matrix illustrated in the above cited patent is considered to be the best mode for carrying out the purpose of this invention.

Figure 7:
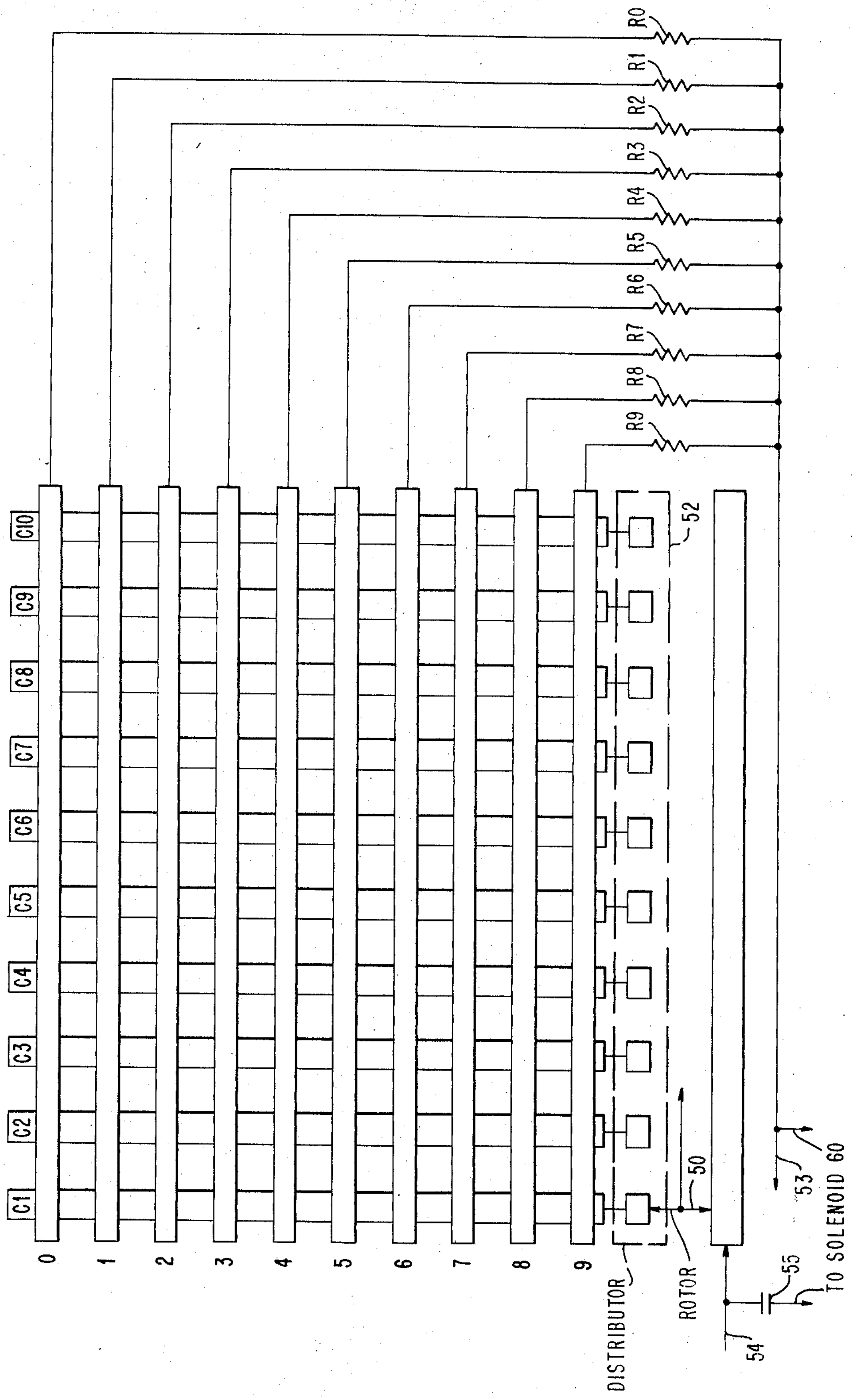
FIGURE 7 is a schematic diagram of the electrical circuits employed in converting the perforated information into electrical signals corresponding thereto.

A schematic representation of a diaphragm type switch matrix is shown in FIGURE 7. Here printed conductive elements (C1 through C10) inclusive are deposited on a substrate and each is connected to an insulated element on a distributor 52. An insulating member not shown separates these printed conductors from a second group of orthoganally arranged printed conductors (0–9) inclusive printed on a second substrate. Conductors (0–9) are connected by resistors R0–R9, inclusive, to a conductor 53 while a rotor 50 is connected to another conductor 54. Conductors 53 and 54 comprise a twisted pair of ordinary telephone wires. When the actuators have been deposited, one for each of column C1–C10, reading commences by supplying a pulse over conductors 53 and 54. This pulse is supplied to the solenoid 40 via a capacitor 55, and causes the interposer 34 to release the conventional Western Electric dial telephone spring motor causing the rotor 50 to scan the distributor 52.

When the rotor reads the first column, a conductive path is provided through the rotor, the distributor segment and the C1 printed conductor to one of the horizontal conductors, the horizontal conductor connected will depend on the position of the deposited actuator 41. Assuming for the moment that the deposited actuator 41 has been positioned in the fifth horizontal row, the conductive path will go along the fifth conductor and through resistor R5 and back to the source and the current in the path will be limited by resistor R5 since resistors R0 through R9 are proportioned to provide a different current for each selected path, the current returned back to the central processor or other controlled device will be indicative of the position occupied by the deposited actuator 41.

The rotor proceeds from left to right sensing each of the columns (C1 through C10) and modulates the current returned back during the reading portion by the particular resistor connected in the circuit by deposition of the actuator 41. The rotor 50 and distributor 52 have been illustrated as being linearly translatory, however, this was done for simplicity. In practice, a rotor and circular distributor are used.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A static perforated media reader comprising:

means for retaining the media, a plurality of actuators, one for each column arranged for translation relative to said media, said actuators each including first actuator means for slideably contacting the media and second actuator means, actuator drive means for positively engaging said second actuator means, means for causing relative translation of the media with respect to said actuator drive means to cause relative movement between the actuators and the media until a first actuator means encounters and enters a perforation at which time the actuator is deflected and the second actuator means disengages from the actuator drive means depositioning the actuator on the media with the first actuator means within the perforation and relative movement between the actuator and the media ceases, and means coacting with the deposited actuators for providing an electrical manifestation indicative of the locations of the deposited actuators.

2. A static perforated media reader comprising:

means for retaining the media, a plurality of actuators, one for each column of data in the media, supported by the retaining means for translation across the media, said actautors each including a first portion for slideably engaging the media during translation and a second projecting portion remote from said media, actuator drive means for positively engaging said second portion of each said actuator, means for translating said actuator engaging means and thereby said actuators via said positive engagement with the said second portion, with respect to said media until the first portion of the actuator enters a perforation at which time the second portion is displaced and disengages from the actuator drive means and the actuator is deposited on the media terminating relative movement between the deposited actuator and the media, and means coacting with the deposited actuators for providing an electrical manifestation indicative of the locations of the deposited actuators.

3. A static perforated media reader comprising:

means for retaining the media, a plurality of guide means each located adjacent to and in alignment with arbitrary columns on the media, a plurality of actuators one for each column, supported by the guide means for translation along the guide means, said actuators each including a first portion for slideably engaging the media during translation, a second portion and a third portion, actuator drive means for positively engaging the second portion of the actuators, means for translating said actuator drive means and thereby said actuators via said positive engagement with the said second portion, with respect to said media as determined by said guide means until the first portion of the actuator encounters and enters a perforation and causes the actuator to be displaced thereby disengaging the second portion of the actuator from the actuator drive means causing the actuator to be deposited on the media and said displacement causing said third actuator portion to engage the media retaining means to retain the actuator in the deposited position, and means coacting with the deposited actuators for providing an electrical manifestation indicative of the locations of the deposited actuators.

4. A static perforated media reader as set forth in claim 3 in which:

said guide means include a plurality of spaced parallel elongated members positioned above the media, and said actuators each include a pair of generally arcuate shoulders which ride on adjacent spaced parallel guides and said first portion extends between the said adjacent guides into sliding engagement with the media to provide angular displacement of the actuator when the first portion encounters and enters a perforation.

5. A static perforated media reader as set forth in claim 4 in which the media is stationary and the engaging means is translated.

6. A static perforated media reader as set forth in claim 5 in which said second portion of each actuator extends from the actuator body and includes a surface in interference with the actuator drive means such that translatory movement of the actuator drive means is transferred to the actuator when the first actuator portion is in sliding engagement with the media and disengages from the actuator drive means when the actuator is angularly displaced by entrance of the first portion into a perforation.

7. A static perforated media reader as set forth in claim 4 in which the means coacting with the deposited actuators comprises a switch matrix including a pair of normally open contacts for each available data position in the media located in proximity to the media and are closed when a first actuator portion enters a perforation.

References Cited

UNITED STATES PATENTS 2,869,790 1/1959 Radke et al.

DARYL W. COOK, Primary Examiner

T. J. SLOYAN, Assistant Examiner

U.S. Cl. X.R.

200—46